(12) United States Patent
Haneda (10) Patent No.: US 7,791,775 B2
(45) Date of Patent: Sep. 7, 2010

(54) IMAGING APPARATUS FOR GENERATING IMAGE HAVING WIDE DYNAMIC RANGE BY USING DIFFERENT EXPOSURES

(75) Inventor: Kazuhiro Haneda, Tokyo (JP)

(73) Assignee: Olympus Corporation, Tokyo (JP)

( * ) Notice: Subject to any disclaimer, the term of this patent is extended or adjusted under 35 U.S.C. 154(b) by 1028 days.

(21) Appl. No.: 11/371,781

(22) Filed: Mar. 9, 2006

(65) Prior Publication Data

US 2006/0245014 A1    Nov. 2, 2006

(30) Foreign Application Priority Data

Apr. 28, 2005    (JP) .............................. 2005-131661

(51) Int. Cl.
*H04N 1/46* (2006.01)
*G03F 3/08* (2006.01)
(52) U.S. Cl. ...................... 358/512; 358/518; 358/505
(58) Field of Classification Search ................. 358/512, 358/518, 1.9, 505
See application file for complete search history.

(56) References Cited

U.S. PATENT DOCUMENTS

2005/0151866 A1 *   7/2005   Ando et al. ................. 348/297

FOREIGN PATENT DOCUMENTS

| JP | 5-145857 | 6/1993 |
|---|---|---|
| JP | 11-234550 | 8/1999 |
| JP | 2002165226 | 7/2002 |
| JP | 2004357335 | 12/2004 |

OTHER PUBLICATIONS

Office Action issued in counterpart Japanese Patent Application No. 2005-131661 dated Feb. 9, 2010.

* cited by examiner

*Primary Examiner*—Benny Q Tieu
*Assistant Examiner*—Ngon Nguyen
(74) *Attorney, Agent, or Firm*—Volpe and Koenig, P.C.

(57) ABSTRACT

An imaging apparatus includes a plurality of color filters arranged in a specific arrangement; a plurality of pixels adjacently arranged in each color filter; an exposure setting section for assigning one of a plurality of exposures to each pixel so as to perform exposure using the plurality of exposures; a readout section for reading out an image signal corresponding to each of the plurality of the exposures from the plurality of the pixels of each color filter; and a synthesizing section for determining an image signal of each color filter, based on the image signals read out by the readout section, and synthesizing the determined image signals of all of the plurality of the color filters, so as to output an image signal for forming an image.

5 Claims, 10 Drawing Sheets

| R11_a | G13_a | R15_a | G17_a |
|---|---|---|---|
| G21_a | B23_a | G25_a | B27_a |
| R31_a | G33_a | R35_a | G37_a |
| G41_a | B43_a | G45_a | B47_a |

LONG-TIME EXPOSURE IMAGE L

FIG. 5B

| R12_b | G14_b | R16_b | G18_b |
|---|---|---|---|
| G22_b | B24_b | G26_b | B28_b |
| R32_b | G34_b | R36_b | G38_b |
| G42_b | B44_b | G46_b | B48_b |

SHORT-TIME EXPOSURE IMAGE S

| R11_a | R12_b | G13_a | G14_b |
|---|---|---|---|
| R21_c | R22_d | G23_c | G24_d |
| G31_a | G32_b | B33_a | B34_b |
| G41_c | G42_d | B43_c | B44_d |

FIG. 10A

| R11_a | G13_a |
|---|---|
| G31_a | B33_a |

LONG-TIME EXPOSURE IMAGE L1

FIG. 10B

| R12_b | G14_b |
|---|---|
| G32_b | B34_b |

SHORT-TIME EXPOSURE IMAGE S1

FIG. 10C

| R21_c | G23_c |
|---|---|
| G41_c | B43_c |

SHORT-TIME EXPOSURE IMAGE S2

FIG. 10D

| R22_d | G24_d |
|---|---|
| G42_d | B44_d |

LONG-TIME EXPOSURE IMAGE L2

| Ye11_a | Ye12_b | Cy13_a | Cy14_b |
|--------|--------|--------|--------|
| Mg21_a | Mg22_b | G23_a  | G24_b  |

FIG. 15

| R | G | R | G |
|---|---|---|---|
| G | B | G | B |
| R | G | R | G |
| G | B | G | B |

FIG. 16

| Ye | Cy | Ye | Cy |
|----|----|----|----|
| Mg | G  | Mg | G  |
| Ye | Cy | Ye | Cy |
| Mg | G  | Mg | G  |

IMAGING APPARATUS FOR GENERATING IMAGE HAVING WIDE DYNAMIC RANGE BY USING DIFFERENT EXPOSURES

BACKGROUND OF THE INVENTION

1. Field of the Invention

The present invention relates to an imaging apparatus for generating an image having a wide dynamic range.

Priority is claimed on Japanese Patent Application No. 2005-131661, filed Apr. 28, 2005, the content of which is incorporated herein by reference.

2. Description of the Related Art

In a conventional imaging apparatus for generating an image having a wide dynamic range, operation of imaging a subject is performed two times with different exposure conditions, so as to obtain two images imaged with different (amount of) exposures, and the obtained images are synthesized so as to generate an image having a wide dynamic range (see Reference Document 1: Japanese Unexamined Patent Application, First Publication No. H11-234550).

In another conventional imaging apparatus, micro-lenses are arranged in a checkered form on an imaging device capable of nondestructive readout, and imaging at each exposure time is performed in a manner such that different sensitivities are respectively assigned to each pixel at which a micro-lens is present and each pixel at which no micro-lens is present, which are arranged alternately. The image data output from both kinds of the pixels are synthesized so as to generate an image having an appropriate and wide dynamic range even for a moving subject (see Reference Document 2: Japanese Unexamined Patent Application, First Publication No. H5-145857).

SUMMARY OF THE INVENTION

The present invention provides an imaging apparatus comprising:

a plurality of color filters arranged in a specific arrangement;

a plurality of pixels adjacently arranged in each color filter;

an exposure setting section for assigning one of a plurality of exposures to each pixel so as to perform exposure using the plurality of exposures;

a readout section for reading out an image signal corresponding to each of the plurality of the exposures from the plurality of the pixels of each color filter; and a synthesizing section for determining an image signal of each color filter, based on the image signals read out by the readout section, and synthesizing the determined image signals of all of the plurality of the color filters, so as to output an image signal for forming an image.

In a typical example, a first pixel and a second pixel, which are adjacent to each other, are arranged in each color filter;

the exposure setting section respectively exposes the first pixel and the second pixel of each color filter by using a first exposure and a second exposure;

the readout section respectively reads out a first image signal from the first pixel and a second image signal from the second pixel; and the synthesizing section determines the image signal of each color filter, based on the first and the second image signals.

In a preferable example, a plurality of sets of the pixels are assigned to each color filter;

the exposure setting section respectively assigns different exposures to the sets of the pixels, so that the pixels belonging to the same set are exposed in the same exposure, and the apparatus further comprises:

an adding and averaging section for subjecting image signals output from the pixels exposed in the same exposure to an adding and averaging process, so as to generate an image signal corresponding to the relevant exposure.

The exposure setting section may set the plurality of the exposures by assigning one of a plurality of charge storage times to each of the plurality of the pixels.

In another preferable example, the exposure setting section sets a first exposure and a second exposure which are different from each other;

the readout section respectively reads out a first image signal corresponding to the first exposure and a second image signal corresponding to the second exposure for each color filter; and the synthesizing section includes:

a saturation detecting section for detecting saturation of output of a predetermined one of the first and the second image signals;

a signal amplifying section for amplifying the other one of the first and the second image signals based on a ratio between the first and the second exposures when saturation of output of the image signal is detected by the saturation detecting section; and a signal synthesizing section for:
determining the image signal of each color filter by using said one of the first and the second image signals when no saturation of output is detected by the saturation detecting section, or by using said the other one of the first and the second image signals, which is amplified by the signal amplifying section, when saturation of output is detected, and
synthesizing the determined image signals of all of the plurality of the color filters.

DESCRIPTION OF THE PREFERRED EMBODIMENTS

Hereinafter, preferable embodiments for implementing the present invention will be described with reference to the appended figures.

Figure 1:
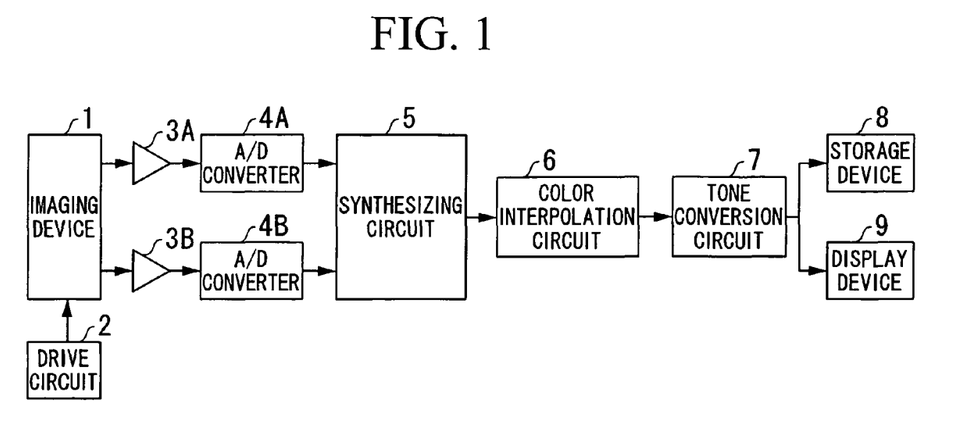
FIG. 1 is a block diagram showing the structure of an imaging apparatus as a first embodiment in accordance with the present invention.

FIG. 1 is a diagram showing the structure of an imaging apparatus as a first embodiment in accordance with the present invention. Below, each structural element in FIG. 1 will be explained.

An imaging device 1 has a device (e.g., a CCD (charge coupled device) sensor) including pixels for receiving light from a subject, which is focused using an optical system (not shown), and generating electric charge based on a quantity of the received light. The imaging device 1 reads out electric charge from each pixel, and produces and outputs an image signal (or image data).

Figure 2:
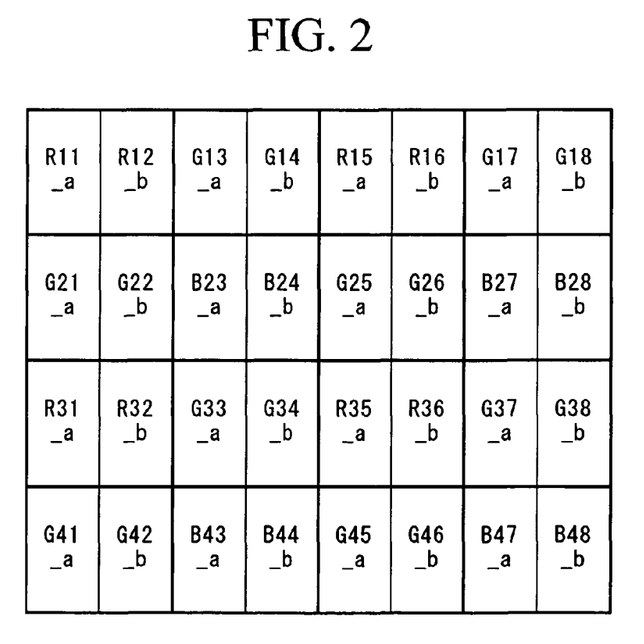
FIG. 2 is a diagram showing arrangement of color filters and pixels in an imaging device in the first embodiment.
Figure 15:
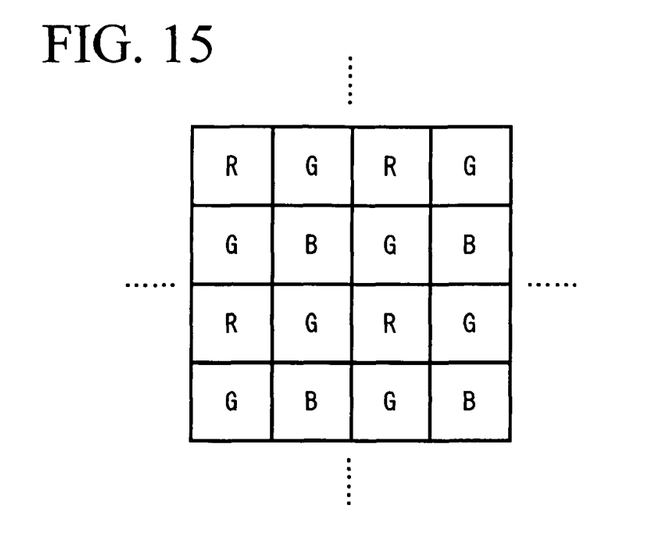
FIG. 15 is a diagram showing a conventional Bayer arrangement of color filters and pixels in an imaging device.

The imaging device 1 has R, G, and B color filters, and a plurality of pixels arranged side by side in each color filter. FIG. 2 shows arrangement of the color filters and the pixels. In FIG. 2, bold lines indicate boundaries between the color filters, and thin lines indicate boundaries between the pixels. In comparison with a conventional arrangement (called a "Bayer arrangement") shown in FIG. 15, the arrangement of FIG. 2 has a feature in which two pixels are horizontally arranged in each color filter. The pixels in FIG. 2 will be explained. The letters "R", "G", and "B" respectively indicate a red filter, a green filter, and a blue filter. The number following each letter indicates the order of each pixel in the vertical and the horizontal directions in the arrangement of the imaging device 1. The suffix "a" or "b" is added for identifying one of the pixels arranged in the same color filter. For example, "R" of the pixel R11_a indicates that a red filter is arranged, "11" indicates the position at the upper-left corner in FIG. 2, and the suffix "a" is a sign for distinguishing the pixel R11_a from the adjacent pixel R12_b assigned to the same color filter.

Again in FIG. 1, a drive circuit 2 drives the imaging device 1. Specifically, the drive circuit 2 respectively controls each pixel indicated by the suffix "a" and each pixel indicated by the suffix "b" at different electronic shutter speeds. The pixels to which different electronic shutter speeds are assigned have different charge storage times. The charge storage time corresponds to the (amount of) exposure or the exposure time. Accordingly, two image signals (i.e., first and second image signals) based on charges stored with different exposure times are simultaneously output from the imaging device 1.

Analog circuits 3A and 3B respectively and appropriately amplify the two signals output from the imaging device 1, and output the amplified signals to A/D converters 4A and 4B. The A/D converters 4A and 4B respectively convert the two signals to digital signals which are output to a synthesizing circuit 5. The synthesizing circuit 5 obtains a single signal by using two signals which are simultaneously read out from adjacent pixels, and synthesizes the obtained signals of the pixels (sequentially obtained in a similar manner), so as to produce an image signal for forming an image. When the signal of one of the adjacent pixels, which has a greater exposure, is saturated, the synthesizing circuit 5 amplifies the signal read out from the other pixel having less exposure. When the signal of the pixel having a greater exposure is not saturated, the synthesizing circuit 5 uses this signal, and when the signal of the pixel having a greater exposure is saturated, the synthesizing circuit 5 uses the above-described amplified signal (detailed description will be provided later). The synthesizing circuit 5 outputs the synthesized signal to a color interpolation circuit 6.

An image corresponding to the synthesized signal has a Bayer arrangement, and one of R, G, and B color signals is assigned to each pixel. In order to assign three color signals (i.e., R, G, and B color signals) to the pixel corresponding to each signal output from the synthesizing circuit 5, the color interpolation circuit 6 generates color signals (which have been lacking) other than the color signal presently assigned to the pixel, by interpolation using color signals of peripheral pixels. A tone conversion circuit 7 performs conversion so that the image output from the color interpolation circuit 6 has an appropriate tone. The image whose tone is converted by the tone conversion circuit 7 is stored in a storage device 8 such as semiconductor memory or a hard disk drive, or displayed on a display device 9 such as a monitor display.

Figure 3:
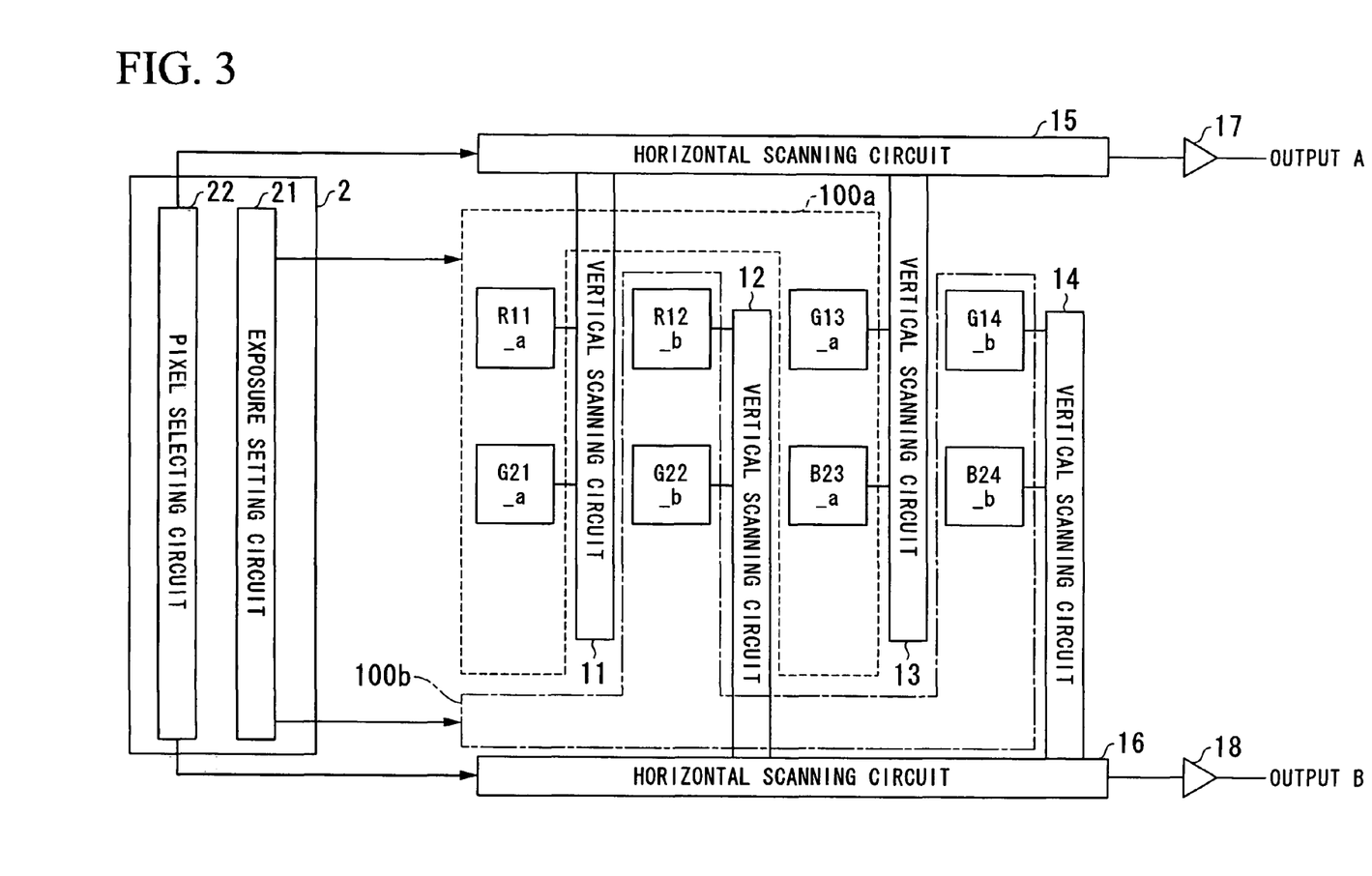
FIG. 3 is a block diagram showing the internal structures of the imaging device and a drive circuit in the first embodiment.

Next, internal structures of the imaging device 1 and the drive circuit 2 will be explained with reference to FIG. 3. In FIG. 3, only some of the pixels shown in FIG. 2 are shown, and the other pixels are omitted. The pixels shown in FIG. 3 are classified into a first set 100a of the pixels of the suffix "a", which is exposed with a first exposure, and a second set 100b of the pixels of the suffix "b", which is exposed with a second exposure. In the imaging device 1, a vertical scanning circuit 11 controls readout of charges from the pixels R11_a and G21_a; a vertical scanning circuit 12 controls readout of charges from the pixels R12_b and G22_b; a vertical scanning circuit 13 controls readout of charges from the pixels G13_a and B23_a; and a vertical scanning circuit 14 controls readout of charges from the pixels G14_b and B24_b. Each of horizontal scanning circuits 15 and 16 receives signals sequentially output from the pixels, and outputs the received signals to the following processing sections. A readout circuit 17 reads out each signal from the horizontal scanning circuit 15, and outputs the readout signal as an output (signal) A. A readout circuit 18 reads out each signal from the horizontal scanning circuit 16, and outputs the readout signal as an output (signal) B.

In the drive circuit 2, an exposure setting circuit 21 assigns an exposure to each pixel by respectively controlling the first set of pixels indicated by the suffix "a" and the second set of pixels indicated by the suffix "b" at different shutter speeds. Accordingly, a plurality of adjacent pixels (two pixels in the present embodiment) arranged in the same color filter are exposed in a plurality of exposures (two kinds of exposures in the present embodiment).

A pixel selecting circuit 22 controls the vertical scanning circuits 11 to 14 and the horizontal scanning circuits 15 and 16 so as to control readout of charge from each pixel (in FIG.

3, lines indicating connection between the pixel selecting circuit 22 and the vertical scanning circuits 11 to 14 are not shown).

Below, control operation for reading out charges from 8 pixels R11_a to B24_b of the imaging device 1 will be described as an example. The exposure setting circuit 21 of the drive circuit 2 assigns an electronic shutter speed corresponding to the first exposure to the pixels indicated by the suffix "a", and also assigns an electronic shutter speed corresponding to the second exposure to the pixels indicated by the suffix "b", so that the charge storage time of each pixel is determined.

The pixel selecting circuit 22 of the drive circuit 2 controls the vertical scanning circuits 11 to 14 and the horizontal scanning circuits 15 and 16 so as to read out a signal from each pixel, generated based on a charge stored in the pixel. Signals from the pixels R11_a and G21_a are read out as the output A by the readout circuit 17 via the vertical scanning circuit 11 and the horizontal scanning circuit 15. Signals from the pixels R12_b and G22_b are read out as the output B by the readout circuit 18 via the vertical scanning circuit 12 and the horizontal scanning circuit 16. Similarly, signals from the pixels G13_a and B23_a are read out as the output A by the readout circuit 17 via the vertical scanning circuit 13 and the horizontal scanning circuit 15. In addition, signals from the pixels G14_b and B24_b are read out as the output B by the readout circuit 18 via the vertical scanning circuit 14 and the horizontal scanning circuit 16.

As described above, the signals from the pixels, which belong to the same color filter and whose exposing operations are respectively controlled by different electronic shutter speeds, are read out at the same time. For example, signals are simultaneously read out from the pixels R11_a and R12_b.

Figure 4:
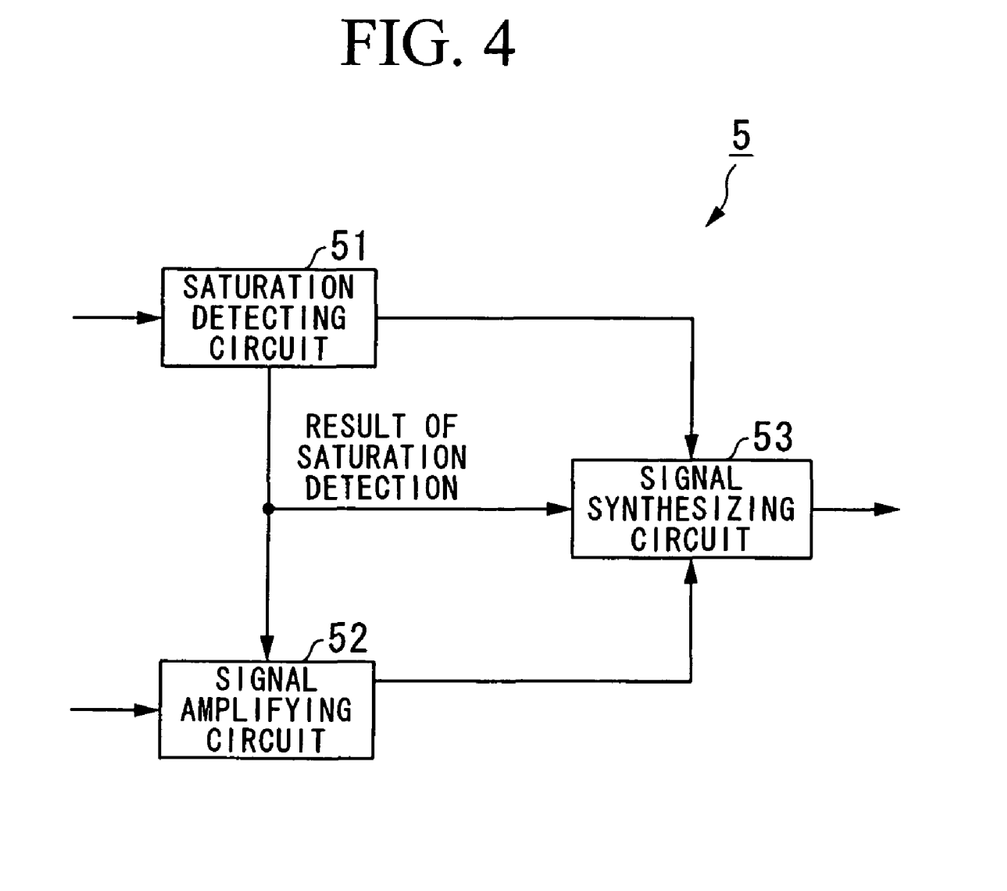
FIG. 4 is a block diagram showing the internal structure of a synthesizing circuit in the first embodiment.

The internal structure of the synthesizing circuit 5 will be explained with reference to FIG. 4. The signal from each pixel exposed with the first exposure is input into a saturation detecting circuit 51. Based on the input signal, the saturation detecting circuit 51 detects saturation of the signal output from the pixel exposed with the first exposure. More specifically, the saturation detecting circuit 51 compares a brightness value indicating brightness of the input signal and a predetermined threshold, and determines whether the input signal is saturated, based on a result of comparison. When the brightness value of the input signal is equal to or greater than the threshold, the saturation detecting circuit 51 outputs a signal indicating that saturation has been detected to an signal amplifying circuit 52 and a signal synthesizing circuit 53. The saturation detecting circuit 51 also directly outputs the input signal itself to the signal synthesizing circuit 53.

The signal from each pixel exposed with the second exposure is input into the signal amplifying circuit 52. When saturation of the output from a pixel is detected by the saturation detecting circuit 51, the signal amplifying circuit 52 amplifies the signal read out from the pixel exposed with the second exposure, which corresponds to the pixel for which saturation was detected (that is, from the pixel belonging to the same color filter to which the pixel for which saturation was detected belongs), at an amplification ratio of the first exposure to the second exposure. For example, it is assumed that saturation of the output from the pixel R11_a has been detected. In this case, based on the signal output from the saturation detecting circuit 51, the signal amplifying circuit 52 amplifies the signal read out from the pixel R12_b. Accordingly, as described later, an image having a wide dynamic range can be obtained. The signal amplifying circuit 52 outputs the amplified signal to the signal synthesizing circuit 53.

The signal synthesizing circuit 53 synthesizes the signals respectively output from the pixels, and generates and outputs an image signal corresponding to an image consisting of the pixels. In the synthesizing process, the signal synthesizing circuit 53 determines the presence/absence of saturation of the output from each pixel (i.e., indicated by the suffix "a"), based on the signal output from the saturation detecting circuit 51. In order to synthesize the signals of the pixels, the signal synthesizing circuit 53 uses (i) the signal output from the saturation detecting circuit 51 (i.e., the signal output from the pixel indicated by the suffix "a") when signal saturation is not detected, or (ii) the signal amplified by the signal amplifying circuit 52 (i.e., the signal output from the pixel indicated by the suffix "b") when signal saturation is detected, thereby generating the image signal for forming an image.

Below, main signal processing operation of the present embodiment will be described in detail. The drive circuit 2 assigns different electronic shutter speeds to adjacent pixels for each color filter in the imaging device 1, and drives the imaging device 1 so as to generate two images having different exposure times. In FIG. 2, "two images having different exposure times" means an image consisting of the pixels indicated by the suffix "a" in FIG. 2 and an image consisting of the pixels indicated by the suffix "b" in FIG. 2.

Figure 5A:
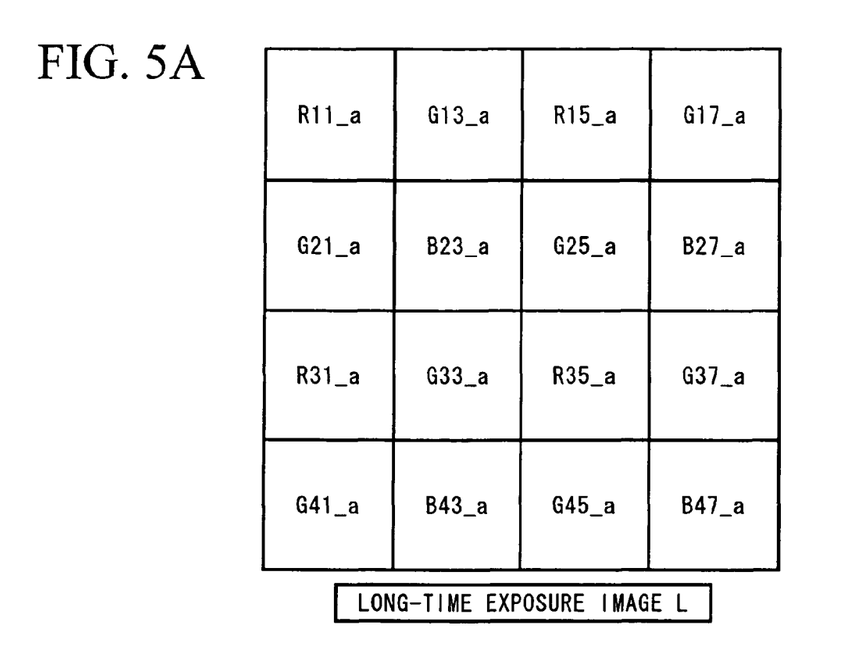
FIGS. 5A and 5B are diagrams showing two images which are exposed in different exposures and simultaneously read out from the imaging device in the first embodiment.
Figure 5B:
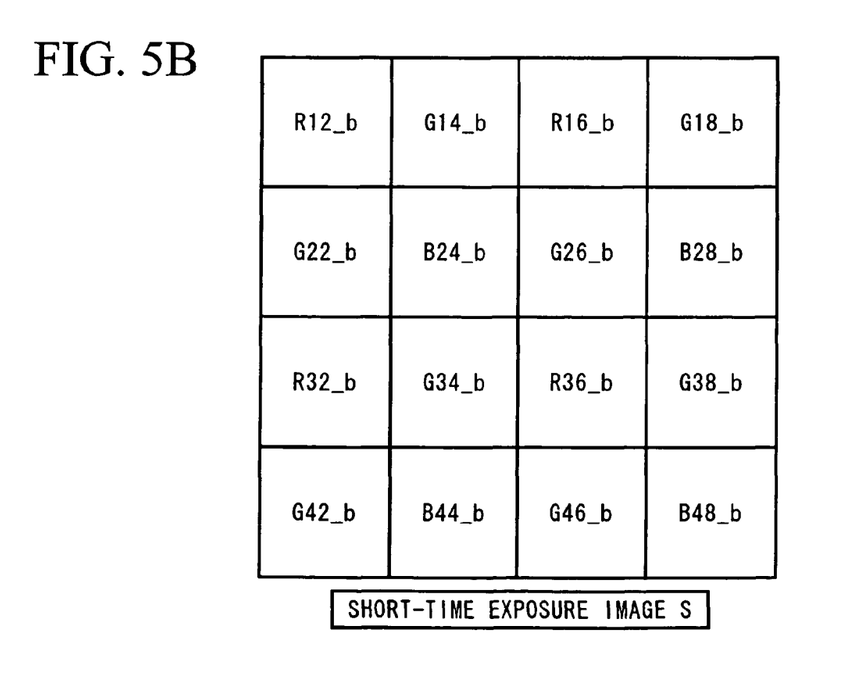

The image consisting of the pixels indicated by the suffix "a" in FIG. 2 may be generated when the electronic shutter speed is set to $1/60$ sec, that is, a long-time exposure image L shown in FIG. 5A may be generated. In contrast, the image consisting of the pixels indicated by the suffix "b" in FIG. 2 may be generated when the electronic shutter speed is set to $1/1000$ sec, that is, a short-time exposure image S shown in FIG. 5B may be generated. In this case, the exposure time $1/60$ sec of the long-time exposure image L corresponds to a specific exposure time (period) of the imaging device 1.

Figure 6:
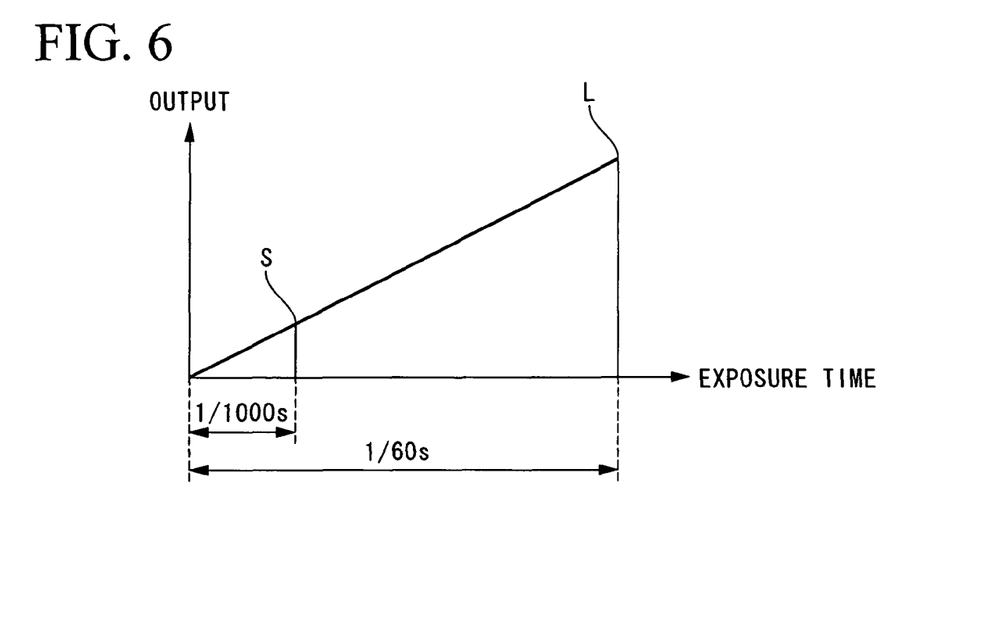
FIG. 6 is a diagram showing an example of the relationship between exposures and output values with respect to the pixels in the first embodiment.

FIG. 6 shows an example of the relationship between the exposure time and the (signal) output. FIG. 6 shows a state in which the output from the pixel increases in proportion to the exposure time. The exposing operations of the two images are simultaneously started, and the short-time exposure image S is generated based on charges stored in the relevant pixels from the start of the exposing operation (i.e., the start of exposure) to the time when $1/1000$ sec has elapsed. The long-time exposure image L is then generated based on charges stored in the relevant pixels from the start of exposure to the time when $1/60$ sec has elapsed. FIG. 6 shows a state in which the short-time exposure image S and the long-time exposure image L have the same timing of the start of exposure; however, the timing of the start of exposure of the short-time exposure image S may be set to any point during the exposure of the long-time exposure image L.

When the specific exposure time of the imaging device 1 has elapsed, the long-time exposure image L and the short-time exposure image S are simultaneously and independently read out as different output signals, and are respectively processed by the analog circuits 3A and 3B, and further processed by the A/D converters 4A and 4B. The synthesizing circuit 5 processes the signal of the pixel R11_a belonging to the long-time exposure image L shown in FIG. 5A and the signal of the pixel R12_b belonging to the short-time exposure image S shown in FIG. 5B, and then processes the signal of the pixel G13_a belonging to the long-time exposure image L shown in FIG. 5A and the signal of the pixel G14_b belonging to the short-time exposure image S shown in FIG. 5B, that is, sequentially processes the signals in real time in order of readout of the signals. In the synthesizing process, when the long-time exposure image L is saturated, the short-time exposure image S is amplified at a ratio of $1/60$ to $1/1000$, that is, by approximately 16 times, thereby obtaining an image having a dynamic range amplified by approximately 16 times.

Figure 7:
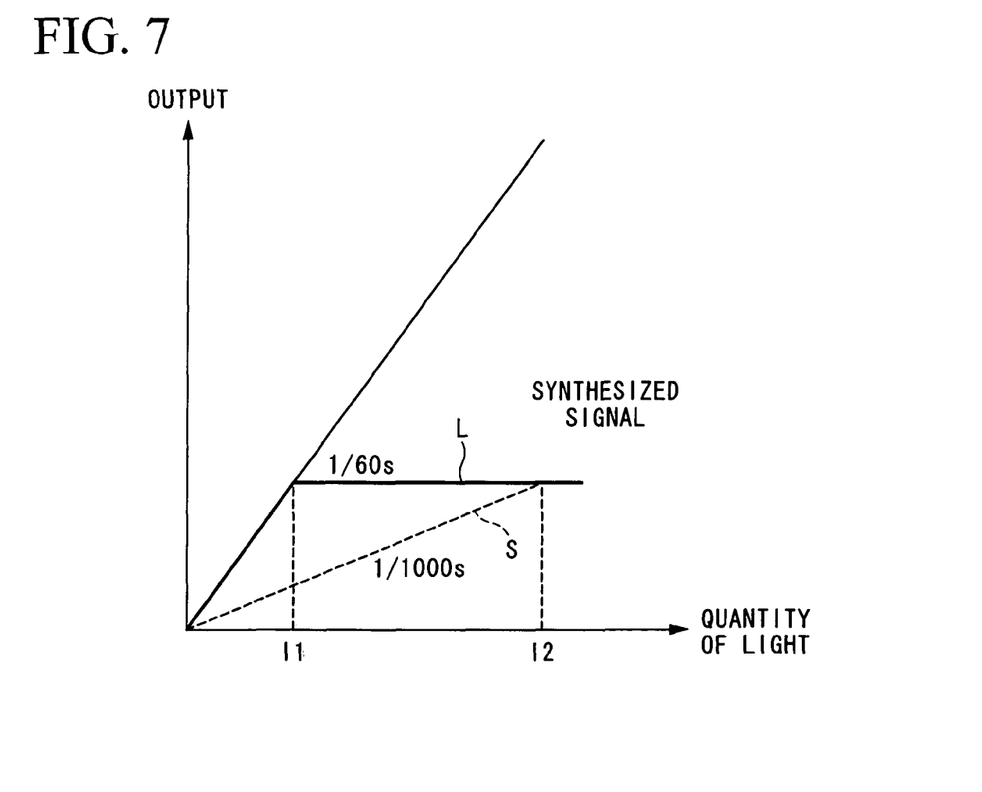
FIG. 7 is a diagram showing an example of the relationship between the quantity of light and the output of a pixel in the first embodiment.

FIG. 7 shows an example of a relationship between the quantity of light (incident on the imaging device 1) and the output of a pixel. In the long-time exposure employing the electronic shutter speed of 1/60, the portion corresponding to this pixel in the image of the subject can be reproduced under a quantity of light of 11; however, when the quantity of light exceeds 11, the output is saturated. On the contrary, in the short-time exposure employing the electronic shutter speed of 1/1000, the charge storage time is shorter in comparison with the case of using the electronic shutter speed of 1/60; thus, the output is not saturated until the quantity of light reaches 12. Therefore, regarding this pixel (actually, two pixels belonging to a color filter, as shown in FIG. 2), the image signal of the long-time exposure image L is used until the quantity of light reaches 11, and after the quantity of light exceeds 11, the image signal of the short-time exposure image S is used, and the determined image signal is synthesized with image signals of the other pixels.

The image synthesized by the synthesizing circuit 5 corresponds to the color filters having a Bayer arrangement. Therefore, an R signal is output from a pixel allocated to each R filter; however, G and B signals are not output from these filters. Similarly, R and B signals are not output from pixels allocated to G filters, and R and G signals are not output from pixels allocated to B filters. Therefore, the color interpolation circuit 6 performs interpolation so as to generate color signals other than the color signal possessed by each pixel. For example, in order to generate a G signal assigned to an R pixel, a value obtained by evaluation based on signals output from G pixels around the R pixel is used as the G signal of this R pixel. In order to obtain R, G, and B signals at each pixel, processing as described above is performed for each pixel.

The above-described two different exposure times are set by controlling the electronic shutter speed. The dynamic range of the synthesized image can be changed by changing the exposure time via the electronic shutter speed.

For example, when electronic shutter speeds of 1/2000 sec and 1/60 sec are set, and the long-time exposure image L and the short-time exposure image S corresponding to the electronic shutter speeds are synthesized, the dynamic range can be amplified approximately 32 times. In addition, when a subject which moves at a high speed is imaged, the specific exposure time of the imaging device 1 is set to a shorter time, so that errors between the long-time exposure image L and the short-time exposure image S can be reduced and an image having less blurring can be generated. For example, when the exposure time of the long-time exposure image L, which corresponds to the specific exposure time of the imaging device 1, is set to 1/120 sec, and the exposure time of the short-time exposure image S is set to 1/2000 sec, and both images are synthesized, blurring can be reduced even for a subject moving at high speed, and an image having an approximately 16 times dynamic range can be obtained.

As described above, in the imaging apparatus of the present embodiment, which has color filters positioned in a Bayer arrangement, independent electronic shutter speeds can be respectively assigned to a plurality of pixels allocated to the same color, so as to generate images having different exposure times. Each of the generated images has a Bayer arrangement for the color filters; thus, color interpolation or the like is performed so as to generate an appropriate color image.

In addition, the generated images are obtained by simultaneous imaging operations in the specific exposure time of the imaging device; thus, even when a moving subject is imaged, displacement between the images is small. Therefore, even when a moving subject is imaged, an image having less blurring can be generated. Timing of starting the exposure for each image may be the same, or not be the same, while each exposure should be performed during the specific exposure time.

When the signal of the longer exposure time is saturated, the signal of the shorter exposure time is amplified at a ratio between the two exposure times, and the amplified signal is used instead of the signal of the longer exposure time, thereby generating an image having a wide dynamic range. In addition, the plurality of images are simultaneously read out from the imaging device 1; thus, the read out pixels can be sequentially subjected to the synthesizing process, and it is unnecessary to use field memory or the like before the synthesizing process. Therefore, it is possible to prevent increase in power consumption or the size of the circuits. In accordance with the present embodiment, a color image with less blurring and having a wide dynamic range can be generated while increase in power consumption or circuit size can be prevented.

Figure 8:
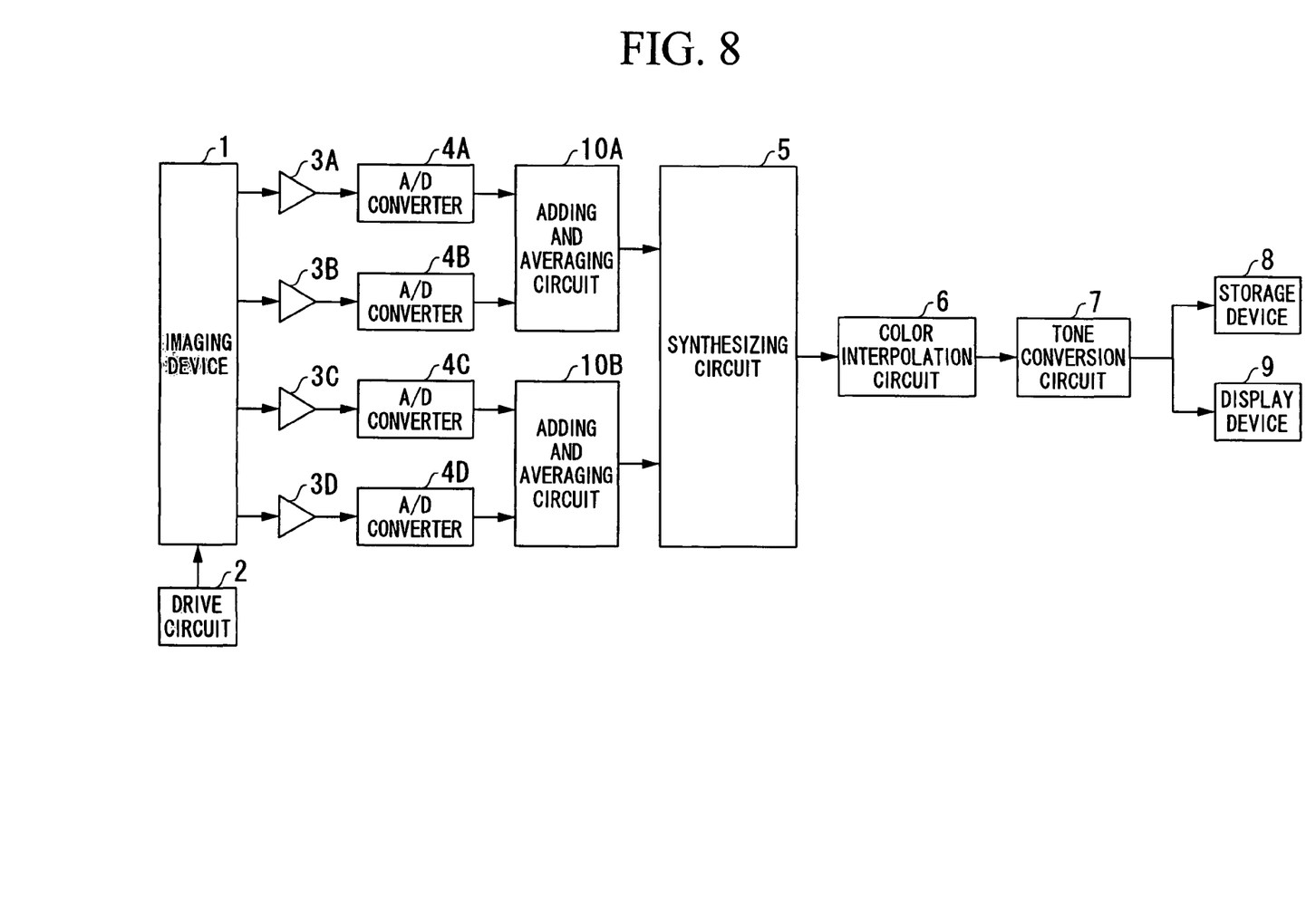
FIG. 8 is a block diagram showing the structure of an imaging apparatus as a second embodiment in accordance with the present invention.
Figure 9:
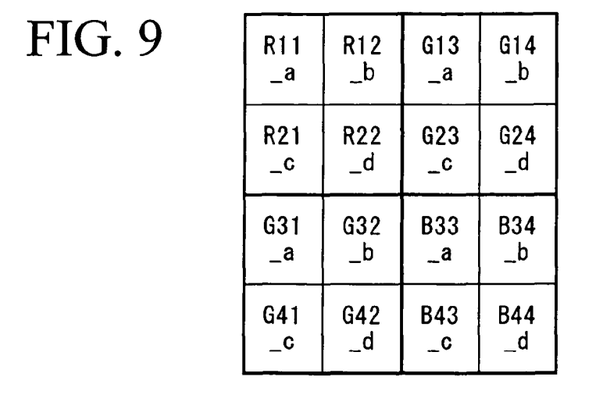
FIG. 9 is a diagram showing arrangement of color filters and pixels in an imaging device in the second embodiment.

A second embodiment of the present invention will be explained below. FIG. 8 shows the structure of an imaging apparatus in accordance with the present embodiment. The imaging device 1 of the present embodiment has an arrangement for the color filters and the pixels as shown in FIG. 9. In FIG. 9, bold lines indicate boundaries between the color filters, and thin lines indicate boundaries between the pixels. In comparison with a conventional Bayer arrangement shown in FIG. 15, the arrangement of FIG. 9 has a feature in which each color filter is two pixels wide and two pixels tall, and thus four pixels are arranged in each color filter. The description of the pixels in FIG. 9 will be explained. Similarly to in the first embodiment, for example, "R" of the pixel R11_a indicates that a red filter is arranged, "11" indicates the vertical and the horizontal positions, and the suffix "a" is a sign for distinguishing the relevant pixel from the other three pixels assigned to the same color filter. The internal structure of the imaging device 1 is similar to that of the imaging device 1 of the first embodiment, while detailed explanations are omitted.

The drive circuit 2 drives the imaging device 1. Regarding the pixels shown in FIG. 9, the drive circuit 2 respectively controls (i) each pixel indicated by the suffix "a" and each pixel indicated by the suffix "d" (i.e., adjacent to the pixel indicated by the suffix "a" in a diagonal direction) at a first electronic shutter speed, and (ii) each pixel indicated by the suffix "b" and each pixel indicated by the suffix "c" (i.e., adjacent to the pixel indicated by the suffix "b" in a diagonal direction) at a second electronic shutter speed. Accordingly, the drive circuit 2 simultaneously reads out different four signals obtained by performing exposure using two different exposure times.

Analog circuits 3A to 3D respectively and appropriately amplify the four signals output from the imaging device 1, and output the amplified signals to A/D converters 4A to 4D. The A/D converters 4A and 4B respectively convert received signals to digital signals which are output to an adding and averaging circuit 10A. The A/D converters 4C and 4D respectively convert received signals to digital signals which are output to an adding and averaging circuit 10B. The adding and averaging circuit 10A performs an adding and averaging process of adding the two received signals and computing an average between the signals, and outputs a signal generated by the process to the synthesizing circuit 5. The adding and averaging circuit 10B also performs the adding and averaging process for the two received signals, and outputs a signal generated by the process to the synthesizing circuit 5. The synthesizing circuit 5 obtains a single signal by using the two signals which are simultaneously processed in the adding and averaging circuits 10A and 10B, and synthesizes the obtained signals of the pixels (sequentially obtained in a similar manner), so as to produce an image signal for forming an image, similarly to in the first embodiment. The generated signal is output to the color interpolation circuit 6. An image having a wide dynamic range is thus generated via the synthesizing circuit 5. The color interpolation circuit 6, the tone conversion circuit 7, the storage device 8, and the display device 9 are similar to those of the first embodiment; thus, explanations thereof are omitted.

Figure 10A:
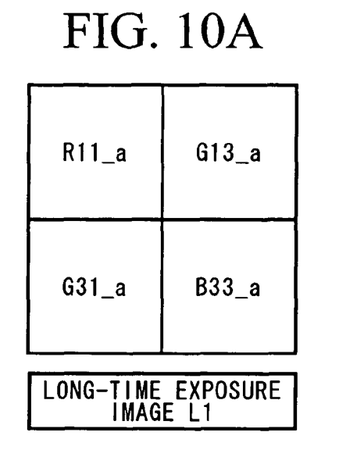
FIGS. 10A to 10D are diagrams showing four images which are exposed in different exposures and simultaneously read out from the imaging device in the second embodiment.
Figure 10B:
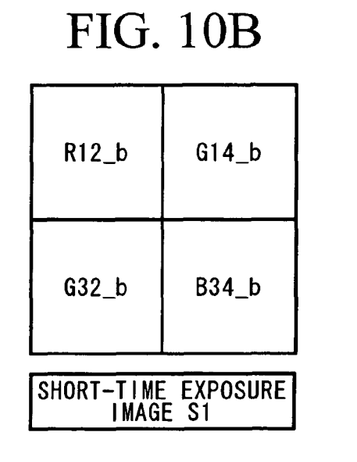
Figure 10C:
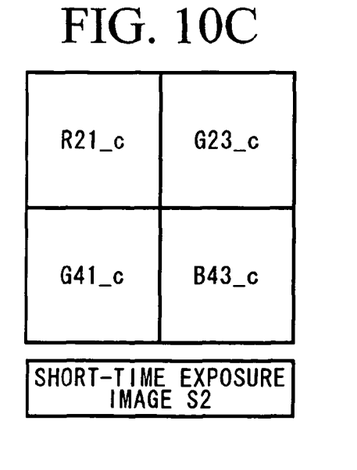
Figure 10D:
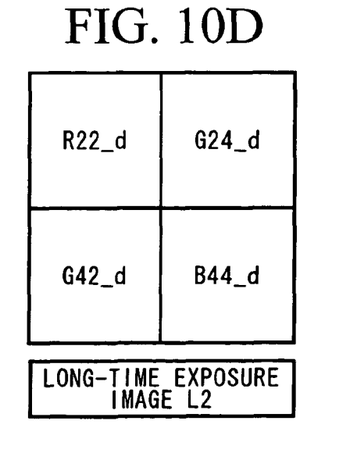

Below, main signal processing in the present embodiment will be explained in detail. The drive circuit 2 drives the imaging device 1 so as to generate two images by using the first exposure time based on the first electronic shutter speed, and simultaneously generate two images by using the second exposure time based on the second electronic shutter speed. The two images generated by imaging using the first exposure time are (i) a long-time exposure image L1 shown in FIG. 10A, consisting of the pixels indicated by the suffix "a" in FIG. 9, and (ii) a long-time exposure image L2 shown in FIG. 10D, consisting of the pixels indicated by the suffix "d" in FIG. 9. On the other hand, the two images generated by imaging using the second exposure time are (i) a short-time exposure image S1 shown in FIG. 10B, consisting of the pixels indicated by the suffix "b" in FIG. 9, and (ii) a short-time exposure image S2 shown in FIG. 10C, consisting of the pixels indicated by the suffix "c" in FIG. 9.

The long-time exposure images L1 and L2 are generated when the electronic shutter speed is set to the first exposure time, for example, $\frac{1}{60}$ sec, while the short-time exposure images S1 and S2 are generated when the electronic shutter speed is set to the second exposure time, for example, $\frac{1}{1000}$ sec.

Figure 11:
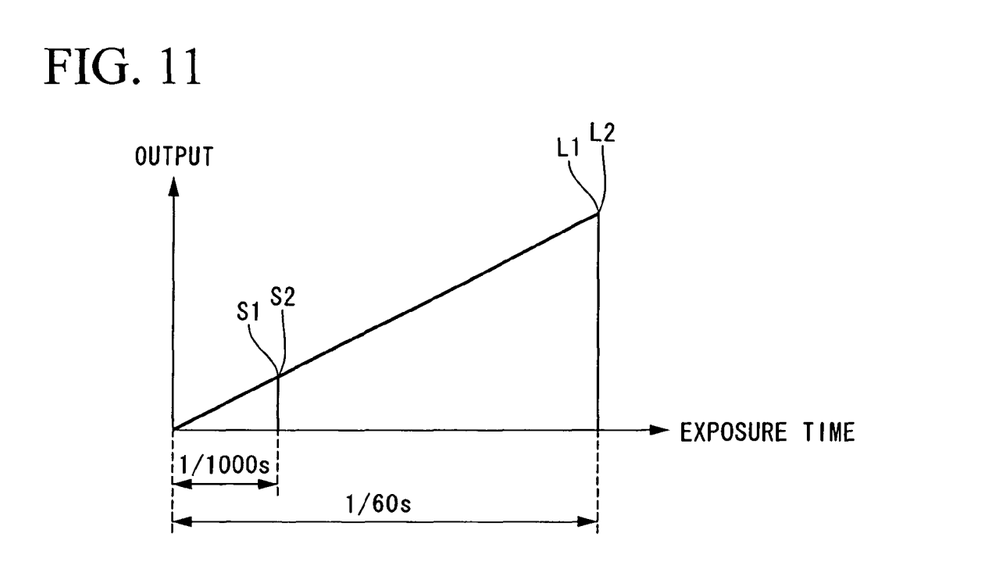
FIG. 11 is a diagram showing an example of the relationship between exposures and output values with respect to the pixels in the second embodiment.

FIG. 11 shows an example of the relationship between the exposure time and the (signal) output. FIG. 11 shows a state in which the output from the pixel increases in proportion to the exposure time. The exposing operations of the four images are simultaneously started, and the short-time exposure images S1 and S2 are generated based on charges stored in the relevant pixels from the start of exposure to the time when $\frac{1}{1000}$ sec has elapsed. The long-time exposure images L1 and L2 are then generated based on charges stored in the relevant pixels from the start of exposure to the time when $\frac{1}{60}$ sec has elapsed.

When the specific exposure time of the imaging device 1 has elapsed, the long-time exposure images L1 and L2 and the short-time exposure images S1 and S2 are simultaneously and independently read out as different output signals. The long-time exposure image L1 is processed by the analog circuit 3A and the A/D converter 4A. The long-time exposure image L2 is processed by the analog circuit 3B and the A/D converter 4B. The short-time exposure image S1 is processed by the analog circuit 3C and the A/D converter 4C. The short-time exposure image S2 is processed by the analog circuit 3D and the A/D converter 4D.

Figure 12A:
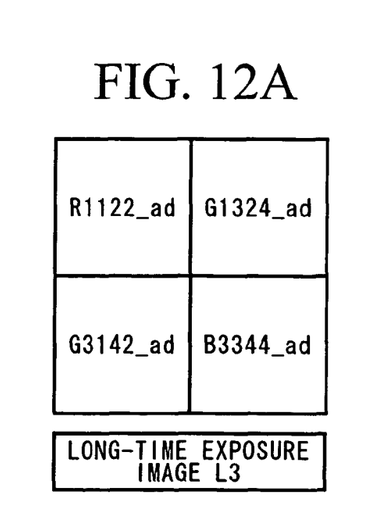
FIGS. 12A and 12B are diagrams showing images after the adding and averaging process is performed in the second embodiment.

The adding and averaging circuit 10A subjects the signals of the long-time exposure images L1 and L2 to the adding and averaging process with respect to brightness levels of the signals, in order of readout from the imaging device 1. More specifically, when the brightness level of the pixel R11_a is α, and the brightness level of the pixel R22_d is β, a single brightness level is generated by computing (α+β)/2. Such processing is performed for every pixel in the long-time exposure images, thereby generating a long-time exposure image L3 shown in FIG. 12A. In FIG. 12A, "R1122_ad" indicates a pixel generated by the adding and averaging process for the pixel R11_a included in the long-time exposure image L1 (see FIG. 10A) and the pixel R22_d included in the long-time exposure image L2 (see FIG. 10D).

Figure 12B:
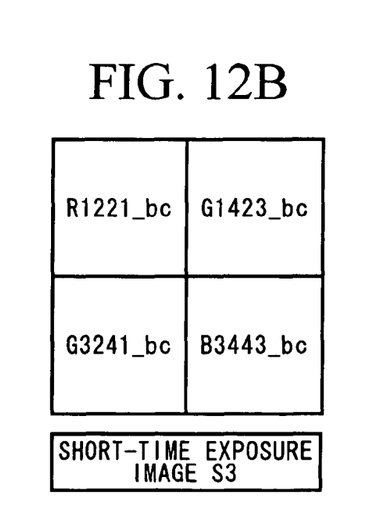

Similarly, the adding and averaging circuit 10B subjects the signals of the short-time exposure images S1 and S2 to the adding and averaging process with respect to brightness levels of the signals, so as to generate a short-time exposure image S3 shown in FIG. 12B. In FIG. 12B, "R1221_bc" indicates a pixel generated by the adding and averaging process for the pixel R12_b included in the short-time exposure image S1 (see FIG. 10B) and the pixel R21_c included in the short-time exposure image S2 (see FIG. 10C).

Due to the adding and averaging process, the long-time exposure image L3 and the short-time exposure image S3 have less noise in comparison with the noise of the imaging device 1.

The synthesizing circuit 5 performs the image synthesizing process by using the long-time exposure image L3 and the short-time exposure image S3. The synthesizing circuit 5 processes the signal of the pixel R1122_ad shown in FIG. 12A and the signal of the pixel R1221_bc shown in FIG. 12B, and then processes the signal of the pixel G1324_ad shown in FIG. 12A and the signal of the pixel G1423_bc shown in FIG. 12B, and synthesizes both processed results, that is, performs the synthesizing process in real time in order of signal readout from the imaging device 1. In the synthesizing process, when the long-time exposure image L3 is saturated, the short-time exposure image S3 is amplified at a ratio of $\frac{1}{16}$ to $\frac{1}{1000}$, that is, by approximately 16 times, thereby obtaining an image having a dynamic range amplified by approximately 16 times.

Figure 13:
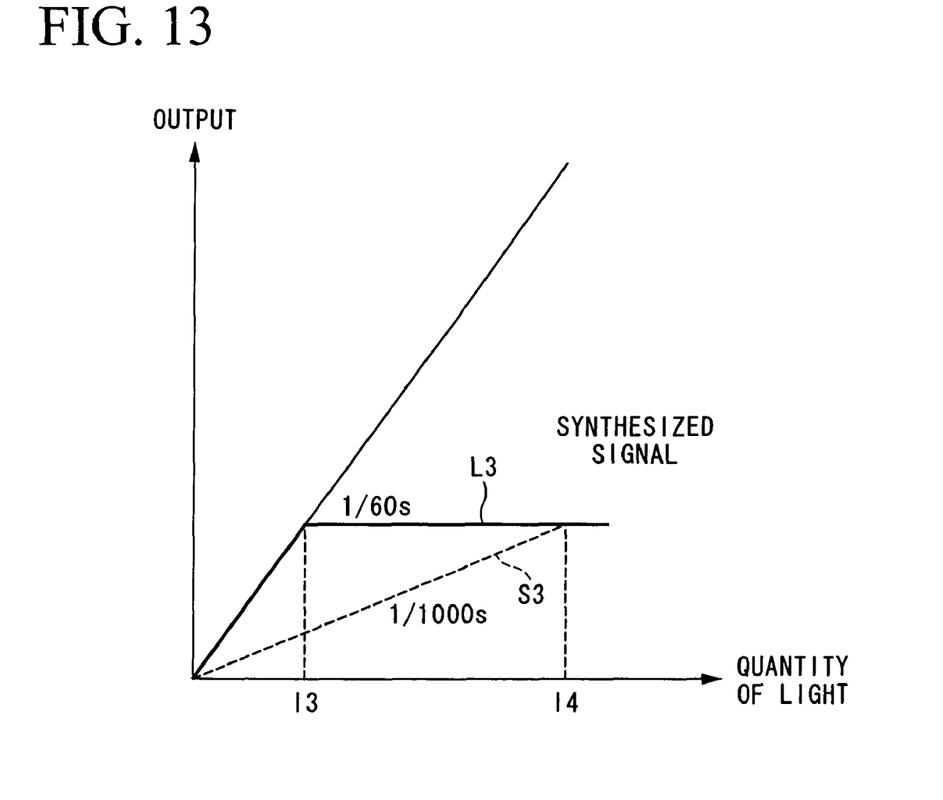
FIG. 13 is a diagram showing an example of the relationship between the quantity of light and the output of a pixel in the second embodiment.

FIG. 13 shows an example of a relationship between the quantity of light and the output of a pixel. In the long-time exposure employing the electronic shutter speed of $\frac{1}{60}$, the portion corresponding to this pixel in the image of the subject can be reproduced under a quantity of light of 13; however, when the quantity of light exceeds 14, the output is saturated. In contrast, in the short-time exposure employing the electronic shutter speed of $\frac{1}{1000}$, the charge storage time is shorter in comparison with the case of using the electronic shutter speed of $\frac{1}{60}$; thus, the output is not saturated until the quantity of light reaches 14. Therefore, regarding this pixel (actually, four pixels belonging to a color filter, as shown in FIG. 9), the image signal of the long-time exposure image L3 is used until the quantity of light reaches 13, and after the quantity of light exceeds 13, the image signal of the short-time exposure image S3 is used, and the determined image signal of this pixel is synthesized with image signals of the other pixels.

Similarly to in the first embodiment, in accordance with the present embodiment, a color image with less blurring and having a wide dynamic range can be generated while increase in power consumption and the circuit size can be prevented. In addition, a plurality of pixels to which a plurality of exposure times are assigned (e.g., the pixels R11_a, R12_b, R21_c, and R22_d in FIG. 9) are allocated to each color filter, while a single exposure time is assigned to each set of pixels (e.g., the set of the pixels R11_a and R22_d, or the set of the pixels R12_b and R21_c in FIG. 9) among the plurality of pixels. Each set of the pixels to which the identical exposure time is assigned is subjected to the adding and averaging process, thereby reducing noise in the image signal.

Figure 14:
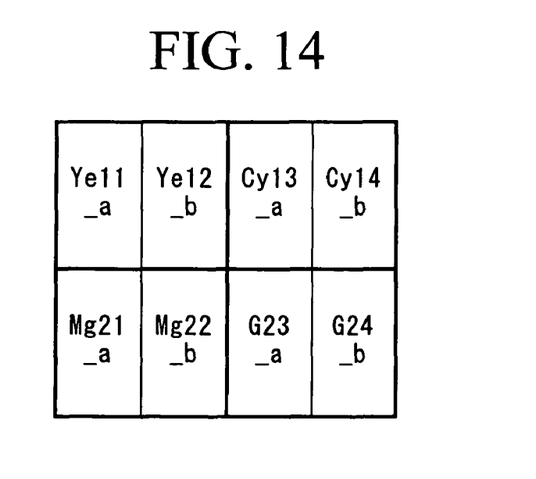
FIG. 14 is a diagram showing arrangement of color filters and pixels in an imaging device in a third embodiment in accordance with the present invention.
Figure 16:
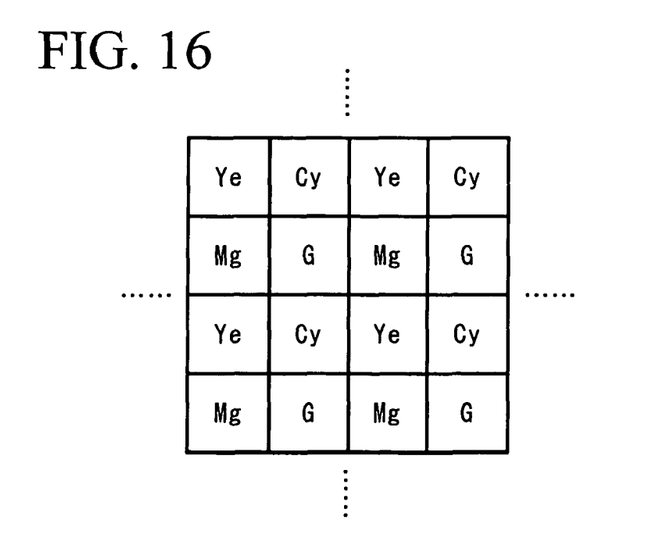
FIG. 16 is a diagram showing a conventional general arrangement for complementary colors, applied to color filters and pixels in an imaging device.

Next, a third embodiment of the present invention will be explained. The imaging apparatus of the present embodiment has the same structure as that shown in FIG. 1; however, the imaging device 1 has an arrangement of the color filters and the pixels as shown in FIG. 14. In FIG. 14, bold lines indicate boundaries between the color filters, and thin lines indicate boundaries between the pixels. In comparison with a conventional general arrangement for complementary colors (see FIG. 16), the arrangement of FIG. 14 has a feature in which two pixels are horizontally arranged in each color filter. The description of the pixels in FIG. 14 will be explained. The letters "Ye", "Cy", "Mg", and "G" respectively indicate a yellow filter, a cyan filter, a magenta filter, and a green filter. The number following each letter indicates the vertical and the horizontal positions in the arrangement of the imaging device 1. The suffix "a" or "b" is added for identifying one of the pixels arranged in the same color filter. For example, "Ye" of the pixel Ye11_a indicates that a yellow filter is arranged, "11" indicates the position at the upper-left corner in FIG. 14, and the suffix "a" is a sign for distinguishing the pixel Ye11_a from the adjacent pixel Ye12_b assigned to the same color filter.

The drive circuit 2 respectively controls each pixel indicated by the suffix "a" and each pixel indicated by the suffix "b" at different electronic shutter speeds. Two image signals based on charges stored with different exposure times are simultaneously output from two output circuits. The two signals output from the imaging device 1 are respectively and appropriately amplified by the analog circuits 3A and 3B, and further converted by the A/D converters 4A and 4B to digital signals. Similarly to in the first embodiment, an image signal for forming an image is generated using the two signals by the synthesizing circuit 5.

The synthesized image corresponds to a color filter arrangement for complementary colors; thus, each pixel does not have a set of R, G, and B color signals. In order to assign R, G, and B color signals to each pixel, the color interpolation circuit 6 generates color signals (which have been lacking) other than the color signal presently assigned to the pixel by interpolation using color signals of peripheral pixels, so as to generate necessary color signals. The tone conversion circuit 7 performs conversion so that the image output from the color interpolation circuit 6 has an appropriate tone. The image whose tone is converted by the tone conversion circuit 7 is stored in a storage device 8 such as semiconductor memory or a hard disk drive, or displayed on a display device 9 such as a monitor display. Similarly to in the first embodiment, in accordance with the present embodiment, a color image with less blurring and having a wide dynamic range can be generated while increase in power consumption or circuit size can be prevented.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, the first or the second embodiment employs an imaging device 1 in which two or four pixels are allocated to each of primary color filters in a Bayer arrangement. However, another number of pixels may be allocated to each color filter. In addition, the arrangement of the color filters is not limited to the Bayer arrangement, and the present invention can be applied to an imaging device having another kind of color filter arrangement.

The third embodiment employs an imaging device in which two pixels are allocated to each of arranged complementary color filters; however, another number of pixels may be allocated to each color filter. In addition, the arrangement of the color filters is not limited to that disclosed in the arrangement, and the present invention can be applied to an imaging device having another kind of color filter arrangement.

In accordance with the present invention, a color image with less blurring and having a wide dynamic range can be generated while increase in power consumption or circuit size can be prevented.

What is claimed is:

1. An imaging apparatus comprising:
   a plurality of color filters arranged in a specific arrangement, each of the color filters filtering a single color;
   a plurality of pixels adjacently arranged in each color filter;
   an exposure setting section for assigning one of a plurality of exposures to each pixel so as to perform exposure using the plurality of exposures;
   a readout section for reading out an image signal corresponding to each of the plurality of the exposures from the plurality of the pixels of each color filter; and
   a synthesizing section for determining an image signal of each color filter, based on the image signals read out by the readout section, and synthesizing the determined image signals of all of the plurality of the color filters, so as to output an image signal for forming an image.

2. The imaging apparatus according to claim 1, wherein:
   a first pixel and a second pixel, which are adjacent to each other, are arranged in each color filter;
   the exposure setting section respectively exposes the first pixel and the second pixel of each color filter by using a first exposure and a second exposure;
   the readout section respectively reads out a first image signal from the first pixel and a second image signal from the second pixel; and
   the synthesizing section determines the image signal of each color filter, based on the first and the second image signals.

3. The imaging apparatus according to claim 1, wherein:
   a plurality of sets of the pixels are assigned to each color filter;
   the exposure setting section respectively assigns different exposures to the sets of the pixels, so that the pixels belonging to the same set are exposed in the same exposure, and
   the apparatus further comprises:
   an adding and averaging section for subjecting image signals output from the pixels exposed in the same exposure to an adding and averaging process, so as to generate an image signal corresponding to the relevant exposure.

4. The imaging apparatus according to claim 1, wherein the exposure setting section sets the plurality of the exposures by assigning one of a plurality of charge storage times to each of the plurality of the pixels.

5. The imaging apparatus according to claim 1, wherein:
   the exposure setting section sets a first exposure and a second exposure which are different from each other;
   the readout section respectively reads out a first image signal corresponding to the first exposure and a second image signal corresponding to the second exposure for each color filter; and
   the synthesizing section includes:
   a saturation detecting section for detecting saturation of output of a predetermined one of the first and the second image signals;
   a signal amplifying section for amplifying the other one of the first and the second image signals based on a ratio between the first and the second exposures when saturation of output of the image signal is detected by the saturation detecting section; and a signal synthesizing section for:
- determining the image signal of each color filter by using said one of the first and the second image signals when no saturation of output is detected by the saturation detecting section, or by using said the other one of the first and the second image signals, which is amplified by the signal amplifying section, when saturation of output is detected, and
- synthesizing the determined image signals of all of the plurality of the color filters.

* * * * *